United States Patent [19]
Yoshino et al.

[11] Patent Number: 5,240,313
[45] Date of Patent: Aug. 31, 1993

[54] ESTIMATED VEHICLE SPEED DETECTION APPARATUS FOR MOTORCYCLES

[75] Inventors: Masato Yoshino; Yoshio Katayama, both of Itami, Japan

[73] Assignee: Sumitomo Electric Industries, Ltd., Osaka, Japan

[21] Appl. No.: 759,677

[22] Filed: Sep. 13, 1991

[30] Foreign Application Priority Data

Sep. 17, 1990 [JP] Japan ................... 2-248293

[51] Int. Cl.⁵ ............................................. G60T 08/66
[52] U.S. Cl. ...................................... 303/111; 303/96; 364/426.02
[58] Field of Search ..................... 303/106, 91, 92, 96, 303/103, 105, 108-111, 9.64; 364/426.02, 426.03

[56] References Cited

U.S. PATENT DOCUMENTS

| | | | |
|---|---|---|---|
| 4,164,872 | 8/1979 | Weigl | 303/96 X |
| 4,420,191 | 12/1983 | Arikawa et al. | 303/103 |
| 4,466,522 | 5/1984 | Sato et al. | 303/106 X |
| 4,760,893 | 8/1988 | Sigl et al. | 364/426.03 X |
| 4,762,375 | 8/1988 | Maki et al. | 303/103 X |
| 4,787,682 | 11/1988 | Muto | 303/103 X |
| 4,811,232 | 3/1989 | Hoashi et al. | 364/426.02 |
| 4,877,295 | 10/1989 | Yoshino | 364/426.02 |
| 4,924,394 | 5/1990 | Uchida et al. | 364/426.02 |
| 4,962,455 | 10/1990 | Ishikawa et al. | 364/426.02 |
| 4,982,348 | 1/1991 | Matsuda et al. | 364/565 |
| 4,989,923 | 2/1991 | Lee et al. | 303/96 X |
| 5,005,916 | 4/1991 | Fujioka et al. | 364/426.02 X |
| 5,132,907 | 7/1992 | Ishikawa | 364/426.02 |

FOREIGN PATENT DOCUMENTS

| | | | |
|---|---|---|---|
| 328155 | 8/1989 | European Pat. Off. | 364/426.02 |
| 330064 | 8/1989 | European Pat. Off. | 364/426.02 |
| 2243833 | 3/1974 | Fed. Rep. of Germany | 303/106 |
| 3919293 | 12/1989 | Fed. Rep. of Germany . | |
| 125461 | 5/1988 | Japan | 364/426.02 |
| 242759 | 10/1988 | Japan | 364/426.02 |

OTHER PUBLICATIONS

English Abstract to Japanese Patent No. 60-61354, Antilock Controlling Method, Apr. 9, 1985.

*Primary Examiner*—Robert J. Oberleitner
*Assistant Examiner*—Alfred Muratori
*Attorney, Agent, or Firm*—Sandler Greenblum & Bernstein

[57] ABSTRACT

An estimated vehicle speed detection apparatus for motorcycles calculates an estimated vehicle speed based on a front wheel speed and a rear wheel speed and applies antilock brake control to each of front and rear wheels based on a calculated estimated vehicle speed. The apparatus includes a memory for storing the estimated vehicle speed at the time an application of antilock brake control to either the front or rear wheel is started, or an application of brakes to either the front or rear wheel starts. The apparatus further includes a calculation unit for comparing the front wheel speed and the rear wheel speed to calculate the estimated vehicle speed based on the higher of the front wheel speed or the rear wheel speed, while antilock brake control is applied to the front or rear wheel or either a front brake or a rear brake is applied. In this case, the rear wheel speed does not exceed the estimated vehicle speed previously stored in the memory.

9 Claims, 9 Drawing Sheets

ESTIMATED VEHICLE SPEED DETECTION APPARATUS FOR MOTORCYCLES

BACKGROUND OF THE INVENTION

1. Field of the Invention

The present invention relates generally to an antilock brake control system for motorcycles, and more particularly to an estimated vehicle speed detection apparatus for use in the antilock brake control system.

2. Description of the Prior Art

When the brakes are applied on a motorcycle in motion, the rotational velocity of the wheels decreases and the travel speed of the motorcycle therefore also decreases.

However, when the brakes are applied in such a manner that a stopping force greater than a certain threshold determined by the coefficient of friction of the road surface is created, such as when the brakes are applied suddenly in an emergency, the wheels lock and slip on the road surface, resulting in a dangerous situation. Antilock brake control systems are designed to eliminate this wheel locking condition by automatically reducing the braking force. One condition used to determine whether to start antilock brake control is a wheel speed slower by a predetermined amount than the vehicle speed, which is determined by comparing the wheel speed with the vehicle speed.

However, an estimated vehicle speed calculated according to the wheel speed is generally used for the vehicle speed. If the estimated vehicle speed is calculated based on the speed of a wheel which is currently under antilock brake control or is being braked, the difference between the actual vehicle speed and the estimated vehicle speed increases. As a result, it becomes difficult to accurately apply antilock brake control.

SUMMARY OF THE INVENTION

Therefore, an object of the present invention is to provide an estimated vehicle speed detection apparatus for motorcycles which can calculate the estimated vehicle speed closest to the actual vehicle speed on a motorcycle even when either the front wheel or the rear wheel is under antilock brake control or is being braked.

To achieve the aforementioned objective, the estimated vehicle speed detection apparatus according to the present invention comprises storage means for storing the estimated vehicle speed at the time the application of antilock brake control to either the front or rear wheel is started, or the application of the brakes to either the front or rear wheel starts. The apparatus further comprises estimated vehicle speed calculation means for comparing the front wheel speed and the rear wheel speed to calculate the estimated vehicle speed based on the higher of the front wheel speed or the rear wheel speed, while antilock brake control is applied to the front or rear wheel or either a front brake or a rear brake is applied. In this case, the rear wheel speed is allowed to be used so far as it does not exceed the estimated vehicle speed previously stored in the storage means.

If the application of antilock brake control to either the front or rear wheel starts, the estimated vehicle speed at that starting time is stored in the storage means. If the brakes are operated thereafter the estimated vehicle speed at the time the brakes are first applied is stored in the storage means in place of the previously stored estimated vehicle speed.

The apparatus according to the present invention can calculate the estimated vehicle speed closest to the actual vehicle speed without obtaining an erroneously high estimated vehicle speed caused by wheel spinning because the estimated vehicle speed is calculated based on the higher of the front wheel speed or the rear wheel speed, which does not exceed the stored estimated vehicle speed.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
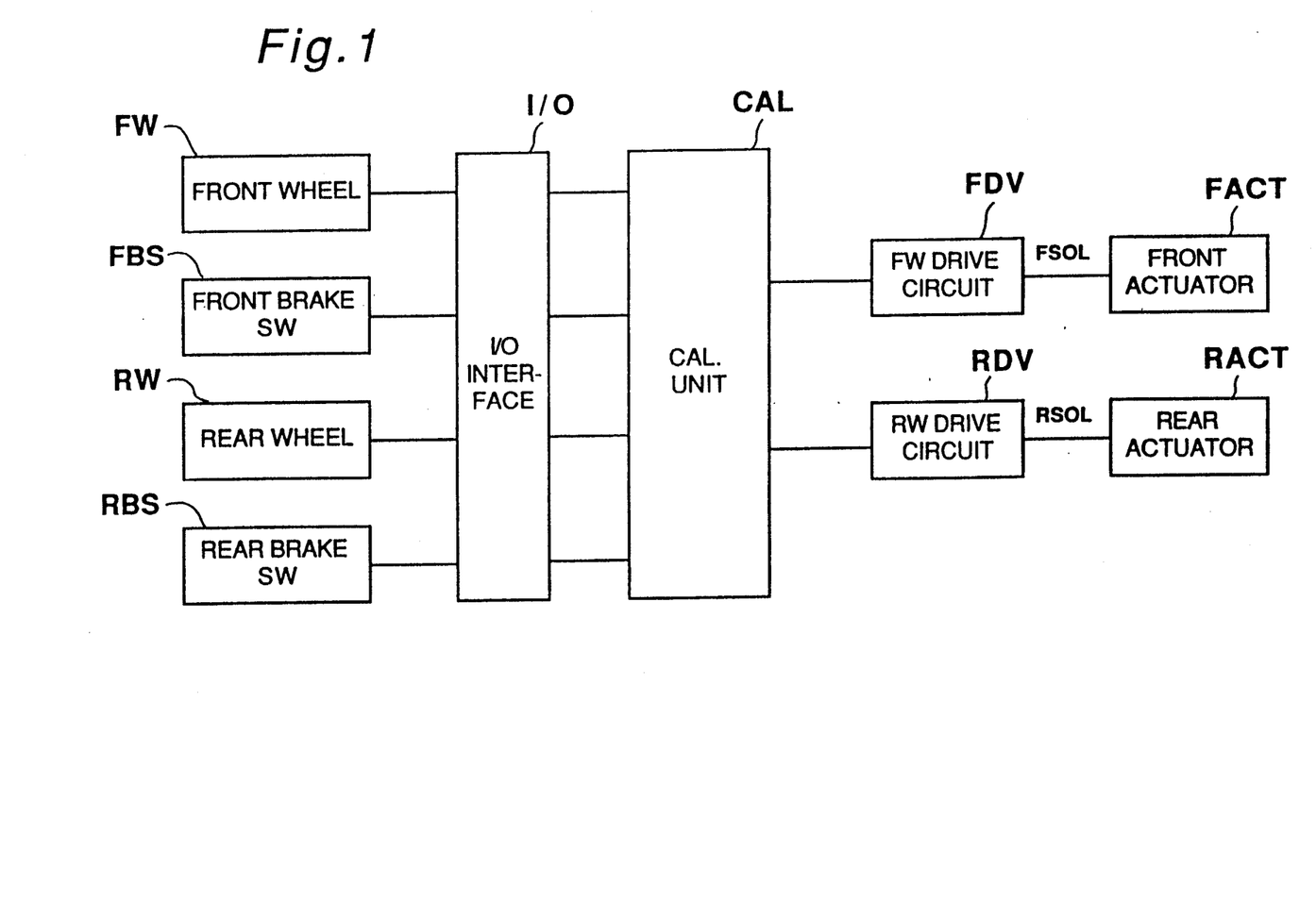
FIG. 1 is a block diagram of an antilock brake control system equipped with an estimated vehicle speed detection apparatus for motorcycles according to the present invention.

FIG. 1 is a block diagram of an antilock brake control system provided with an estimated vehicle speed detection apparatus for motorcycles according to the present invention. As shown in the figure, this system comprises a front wheel brake switch FBS at the front wheel FW and a rear wheel brake switch RBS at the rear wheel RW, an input interface I/O, and a calculation unit CAL. The input interface I/O outputs signals corresponding to the rotational speed of the front and rear wheels and signals corresponding to the on/off state of the front and rear wheel brake switches. The output signals from the input interface I/O are input to the calculation unit CAL, which performs the estimated vehicle speed calculations and the calculations required for antilock brake control for the front and rear wheels. The computed result for front wheel antilock brake control is applied to a front wheel drive circuit FDV, which outputs a front wheel solenoid output FSOL to drive a front wheel actuator FACT including a solenoid. Through a similar operation, the computed result for rear wheel antilock brake control is applied to a rear wheel drive circuit RDV which outputs a rear wheel solenoid output RSOL to a rear wheel actuator RACT. The front and rear wheel actuators FACT and RACT increase or decrease the respective brake hydraulic pressure for independent antilock brake control of the front and rear wheels.

Figure 2A:
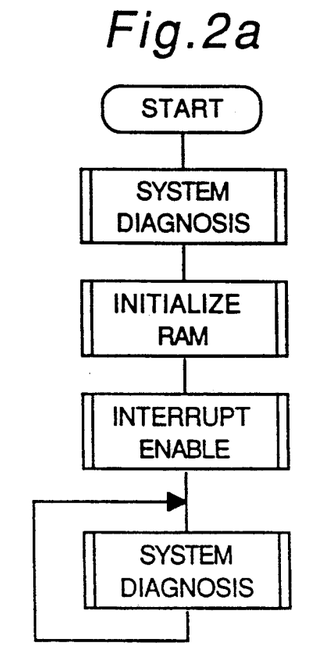
FIGS. 2a, 2b, and 2c are flow charts outlining the control steps executed by a calculation unit.
Figure 2B:
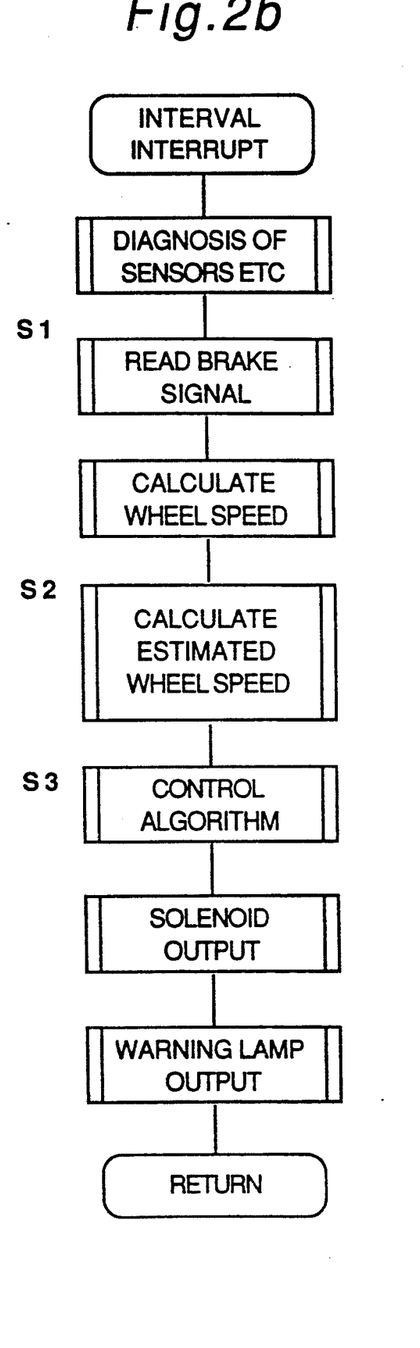
Figure 2C:
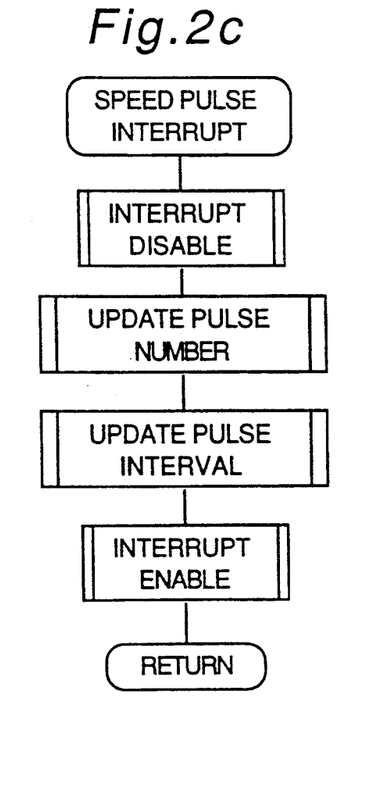

Flow charts shown in FIGS. 2a, 2b, and 2c summarize control steps executed by the calculation unit CAL.

The basic control routine is shown in FIG. 2a with the first step being a diagnostic test run when the system is energized at the first time. A RAM is then initialized and an interrupt enable signal is output. Thereafter the system diagnostics block is looped through continuously.

FIG. 2b shows an interrupt process executed at intervals during the system diagnostics block shown in the last step in FIG. 2a. The interval interrupt process comprises plural sub-routines, the first of which is a diagnostics test of the system solenoids, sensors, and other components. This is followed by a brake operation signal read operation in a sub-routine S1. A sub-routine to calculate the wheel speed and deceleration is then run, followed by a sub-routine S2 to calculate the estimated vehicle speed. A control algorithm sub-routine S3 is then executed to determine whether antilock brake control was started or is in progress. Thereafter, a solenoid output sub-routine and a warning lamp output sub-routine are executed and a complete regular interrupt sub-routine is completed. After a predetermined period has passed, the interval interrupt sub-routine is looped through again.

FIG. 2c shows a wheel speed pulse interrupt routine by which a pulse dependent upon the rotational speed of the front and rear wheels is determined. This wheel speed pulse interrupt routine includes sub-routines to disable an interrupt, update the pulse number, update the pulse interval, and re-enable an interrupt. Because the wheel speed pulse interrupt routine starts by blocking any interrupt operation, the interval interrupt routine does not start even when the time for the interval interrupt routine has come, thereby enabling the wheel speed pulse interrupt routine to be run with precedence to update the wheel speed pulse number and the pulse interval. Thereafter the interrupt is re-enabled and the interval interrupt routine is executed.

Figure 3:
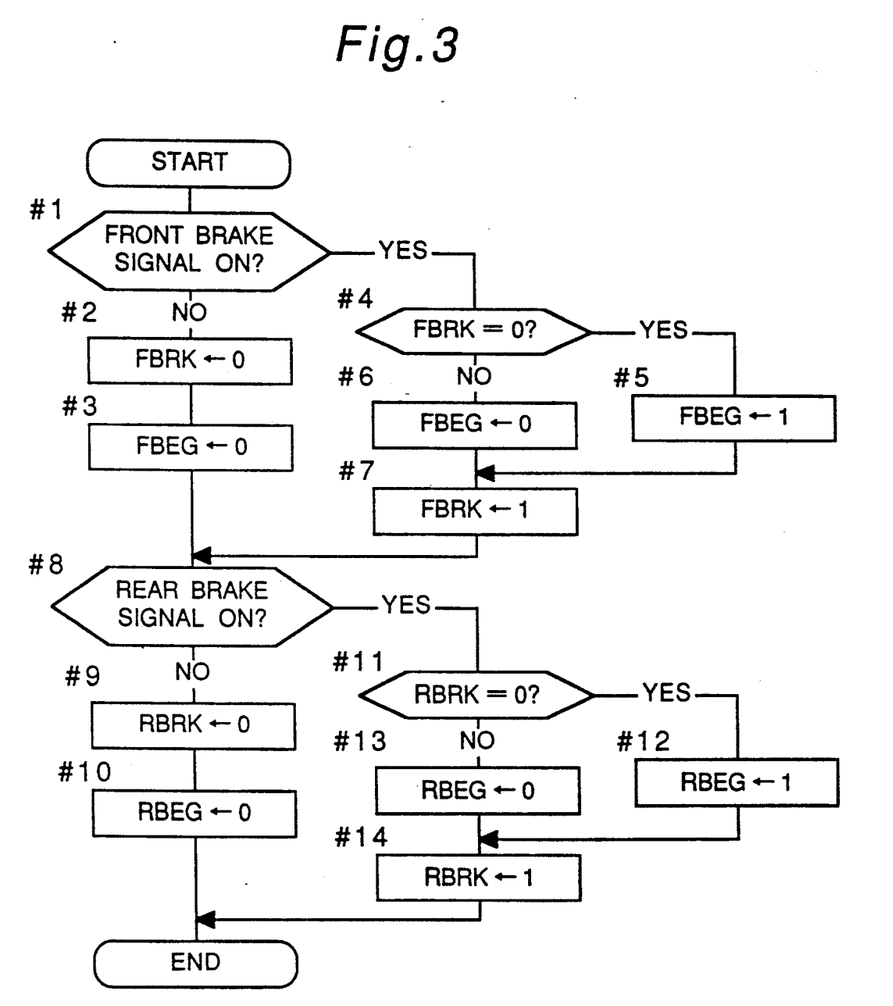
FIGS. 3, 5a, 5b, 6, and 7 are flow charts describing in detail the control steps executed by the calculation unit.

FIG. 3 is a flow chart showing the steps in the brake operation signal read sub-routine S1 shown in FIG. 2b.

At Step #1 it is determined whether a front brake operation signal is ON, i.e., whether the front wheel brake switch FBS shown in FIG. 1 is ON or OFF. If the result is NO, i.e., if the front brake is not applied and the front brake operation signal is therefore OFF, the procedure advances to Step #2 to reset a front brake flag FBRK to 0, and to Step #3 to reset a front brake edge flag FBEG to 0. The front brake flag FBRK is a flag which is set to 1 while the front brake is applied. The front brake edge flag FBEG is a flag which outputs 1 in pulse when the front brake condition is changed from OFF to ON and outputs 0 at all other times.

However, if a YES is returned at Step #1, i.e., the front brake is applied and the front brake operation signal is therefore ON, the procedure advances to Step #4 to determine whether the front brake flag FBRK is set to 0. If it is, the procedure advances to Step #5 to set the front brake edge flag FBEG to 1. However, if the front brake flag FBRK is already set to 1, the procedure advances to Step #6 to reset the front brake edge flag FBEG to 0. From both Steps #5 and #6, the procedure advances to Step #7 to set the front brake flag FBRK to 1.

The sub-routine from Step #1 to #7 is the sequence by which the status of the front brake is evaluated. The following sequence of Steps #8 to #14 is that for rear brake evaluation.

At Step #8 it is determined whether a rear brake operation signal is ON, i.e., whether the rear wheel brake switch RBS shown in FIG. 1 is ON or OFF. If the result is NO, i.e., if the rear brake is not applied and the rear brake operation signal is therefore OFF, the procedure advances to Step #9 to reset a rear brake flag RBRK to 0, and to Step #10 to reset a rear brake edge flag RBEG to 0.

However, if the rear brake is applied and the rear brake operation signal is therefore ON, the procedure advances to Step #11 to determine whether the rear brake flag RBRK is set to 0. If it is, the procedure advances to Step #12 to set the rear brake edge flag RBEG to 1. However, if the rear brake flag RBRK is not 0, the procedure advances to Step #13 to reset the rear brake edge flag RBEG to 0. Then at Step #14 the rear brake flag RBRK is set to 1.

Figure 4:
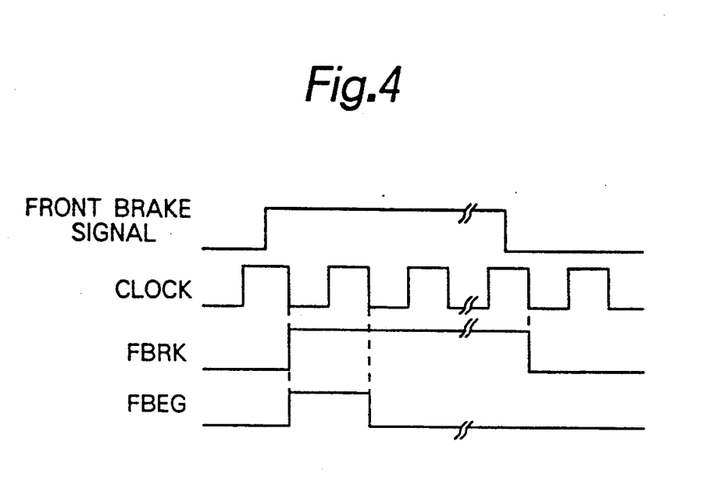
FIGS. 4 and 8 are timing charts.

FIG. 4 is a timing chart of several signals, and the specific operation controlled by the flow chart in FIG. 3 is described below.

When the front brake is not applied, Steps #1, #2, and #3 are executed, thereby resetting both the front brake flag FBRK and the front brake edge flag FBEG to 0. In the first loop through this sub-routine after the front brake is applied (corresponding to a falling edge of a clock signal in FIG. 4), the procedure advances from Step #1 to Step #4. Because at Step #4 the front brake flag FBRK is still reset to 0, the procedure advances to Step #5 to set the front brake edge flag FBEG to 1, and then proceeds to Step #7 to set the front brake flag FBRK to 1.

Because the brakes are still being applied in the next loop through this sub-routine, the procedure advances from Step #1 to Step #4. Because the front brake flag FBRK is now set to 1, the procedure flows to Step #6 to reset the front brake edge flag FBEG to 0, after which the front brake flag FBRK is kept set to 1 at Step #7.

Thereafter, the procedure continues to loop through Steps #1, 4, 6, and 7 until the front brake is released, at which time the sub-routine flows through Steps #1, 2, and 3, thereby resetting both the front brake flag FBRK and the front brake edge flag FBEG to 0.

Thus, when the front brake is operated, the front brake flag FBRK remains set for as long as the brake is applied. However, while the front brake edge flag FBEG is set to 1 when the front brake is applied, it is reset to 0 at the next cycle and held at 0 thereafter.

As occurs with the front brake, the rear brake flag RBRK is kept set while the rear brake is applied. However, the rear brake edge flag RBEG is set to 1 when the rear brake is applied and is reset to 0 at the next cycle and held at 0 thereafter.

Figures 5, 5A:
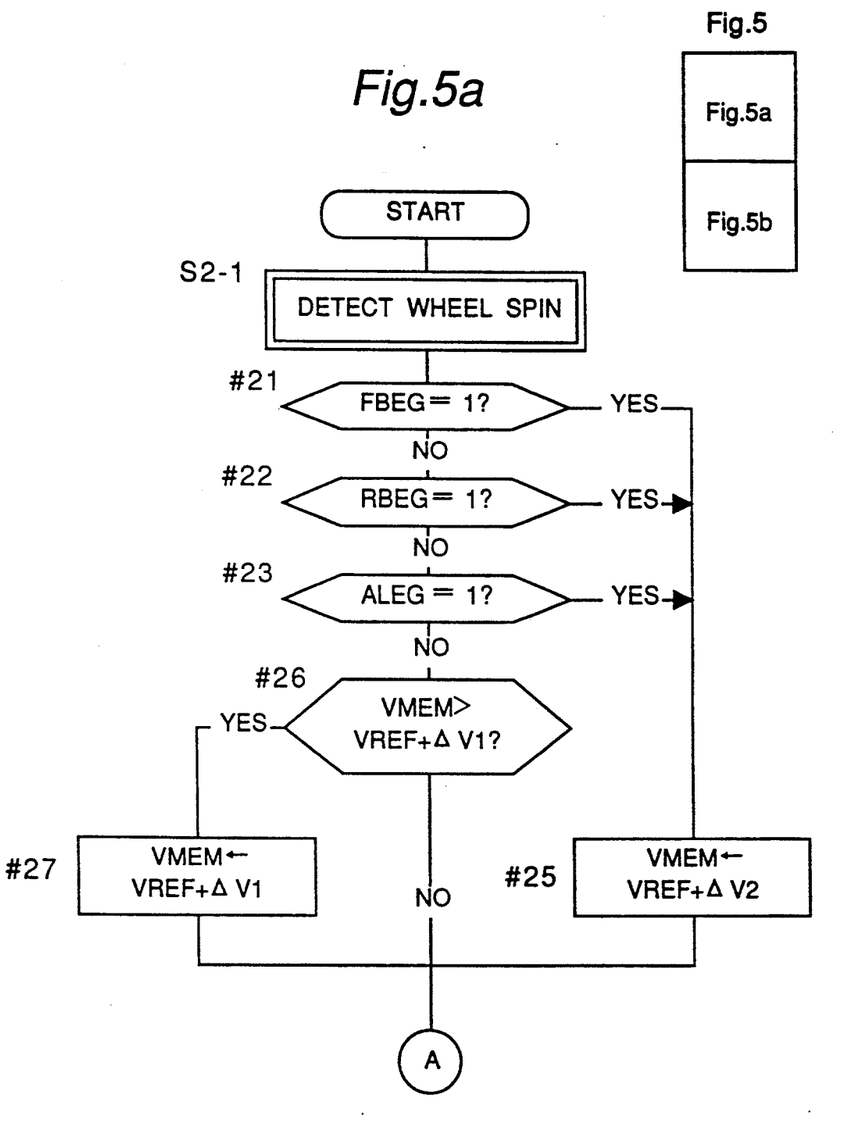
FIG. 5 is a view showing the association of FIGS. 5a and 5b with each other.
Figure 5B:
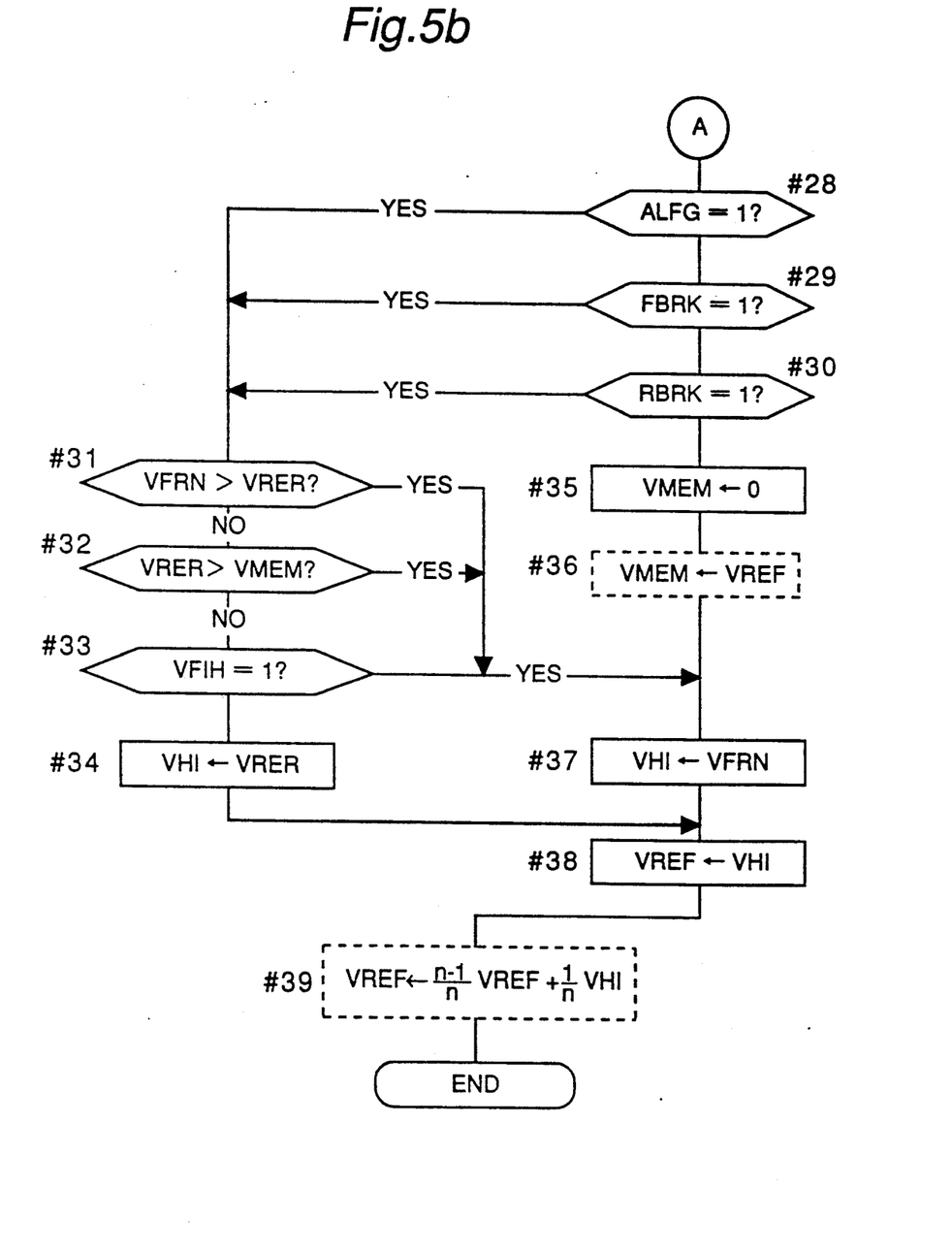

FIGS. 5a and 5b are flow charts of the sub-routine S2 for calculation of the estimated vehicle speed. This sub-routine starts by executing the sub-routine S2-1 to detect any wheel spin by which it is determined whether the rear wheel speed can be used to calculate the estimated vehicle speed based on detection of rear wheel spin. This wheel spin detection sub-routine is described first below with reference to FIG. 6.

Figure 6:
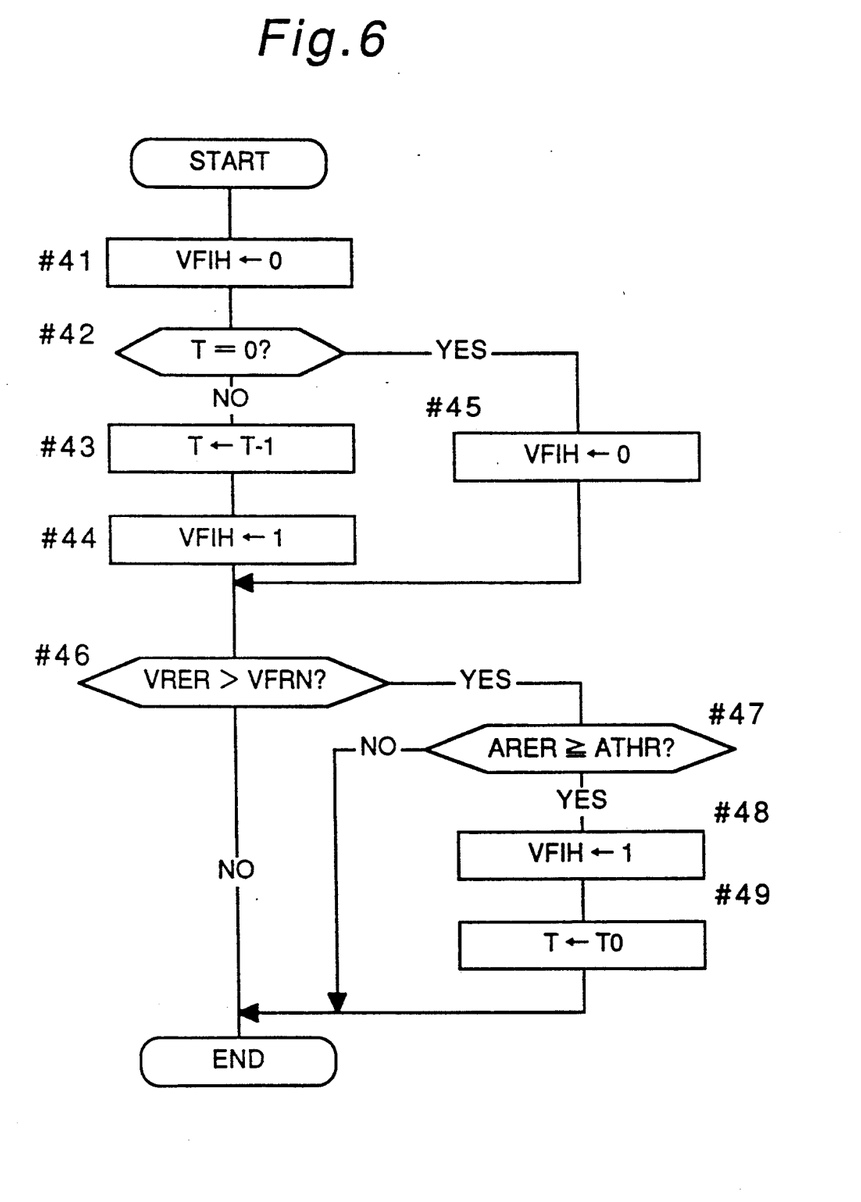

Referring to FIG. 6, a rear wheel use prohibit flag VFIH is reset to 0 at Step #41. This rear wheel use prohibit flag VFIH is used to indicate whether the rear wheel speed can be used to calculate the estimated vehicle speed. If the rear wheel use prohibit flag VFIH is set to 1, the use of the rear wheel speed is prohibited. In contrast, if the rear wheel use prohibit flag VFIH is set to 0, the use of the rear wheel speed is enabled.

At Step #42 it is determined whether a timer T is 0. The timer T is a decrementing timer which counts a predetermined period from the time the rate of rear wheel acceleration exceeds a predetermined rate of acceleration. When the timer T count is 0, i.e., when rear wheel acceleration does not exceed the predetermined acceleration, the procedure advances to Step #45 to reset the rear wheel use prohibit flag VFIH to 0. However, if the timer T count is not 0, i.e., the rear wheel acceleration exceeds the predetermined acceleration and the predetermined period is being counted, the procedure advances to Step #43 to decrement the timer T count by one, and then to Step #44 to set the rear wheel use prohibit flag VFIH to 1.

At Step #46 a front wheel speed VFRN and a rear wheel speed VRER are compared with each other. If the rear wheel speed VRER is greater, the procedure advances to Step #47 to further determine whether the rear wheel acceleration ARER is greater than a predetermined acceleration ATHR. If the rear wheel acceleration ARER is less than the predetermined acceleration ATHR, the sub-routine S2-1 terminates. However, if the rear wheel acceleration ARER is greater than or equal to the predetermined acceleration ATHR, the procedure advances to Step #48 to set the rear wheel use prohibit flag VFIH to 1 and then set the timer T to a predetermined time T0 at Step #49. In other words, the wheel spin detection sub-routine is used to set the rear wheel use prohibit flag VFIH to 1 to block the calculation of the estimated vehicle speed based on the rear wheel when the rear wheel speed VRER exceeds the front wheel speed VFRN and the rear wheel acceleration ARER exceeds the predetermined acceleration ATHR.

It is to be noted that the wheel spin detection can be altered to different manners to set VFIH.

Figure 7:
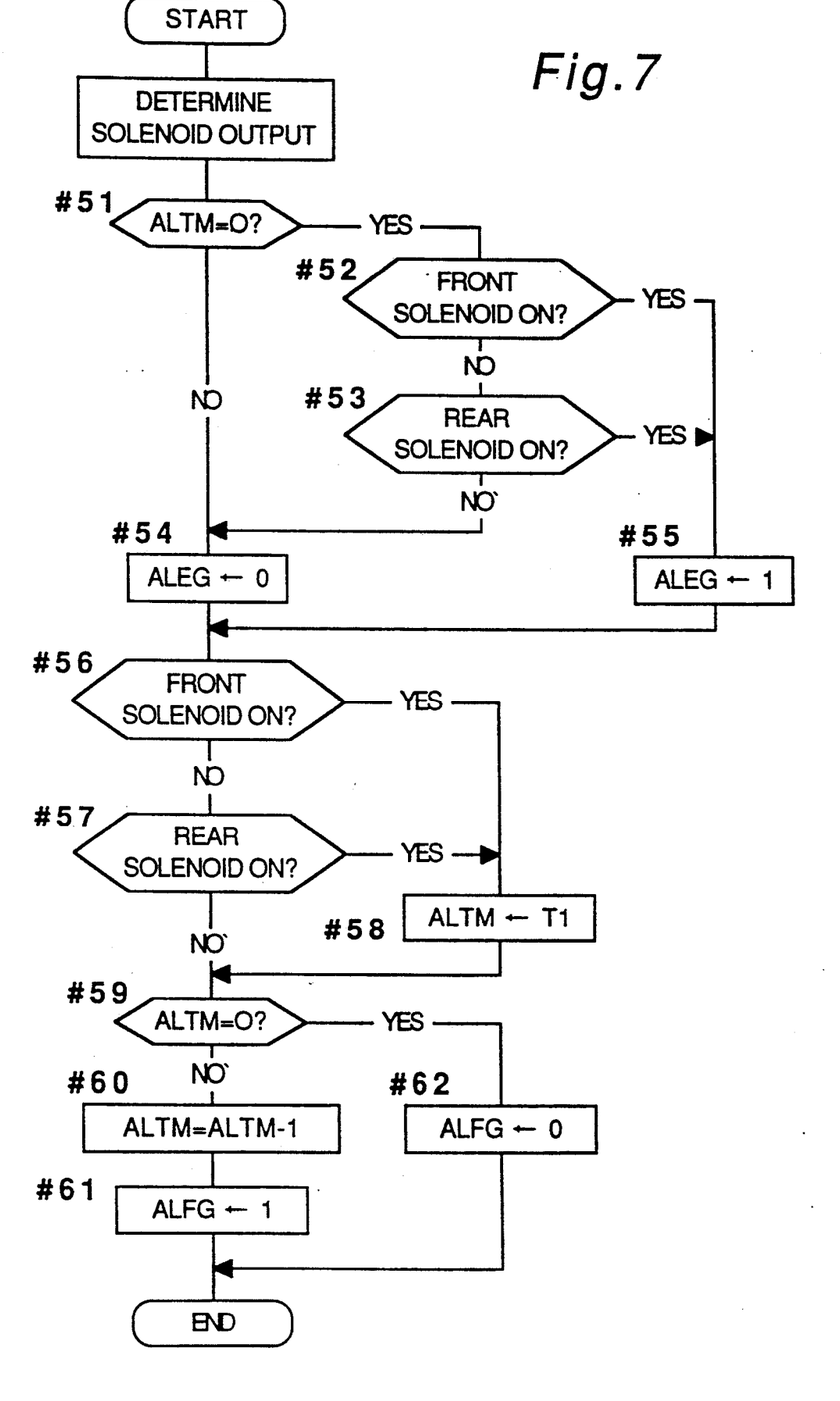

Returning to FIG. 5a, it is determined at Step #21 whether the front brake edge flag FBEG, which is set during the brake operation signal read sub-routine S1 shown in FIG. 3, is set. If it is, the procedure advances to Step #25. In contrast, if the front brake edge flag FBEG is reset, the procedure advances to Step #22. Similarly, it is determined at Step #22 whether the rear brake edge flag RBEG, which is also set during sub-routine S1 shown in FIG. 3, is set. If it is, the procedure advances to Step #25, but if RBEG is reset, the procedure advances to Step #23. At Step #23 it is determined whether an antilock brake control edge flag ALEG, which is described hereinafter with reference to FIG. 7, is set. If it is, the procedure advances to Step #25, but if ALEG is reset, the procedure advances to Step #26. Therefore, if it is immediately after the front or the rear brake was applied or immediately after antilock brake control was started as determined at Steps #21, 22, and 23, the procedure advances to Step #25. However, if it is not immediately after the front or the rear brake was applied and it is not immediately after antilock brake control was started, the procedure advances to Step #26.

At Step #26, a value equal to an estimated vehicle speed VREF obtained in the previous cycle increased by a first predetermined speed ΔV1 is compared with a speed stored in a memory VMEM, which is described below. If the speed stored in the memory VMEM is greater, the procedure advances to Step #27. However, if the speed stored in the memory VMEM is less, the procedure advances to Step #28. It is recommendable that the first predetermined speed ΔV1 is, by way of example, a speed within the range 10 km/hr to 20 km/hr. At Step #27 a value equal to the estimated vehicle speed obtained in the previous cycle plus the first predetermined speed ΔV1 is stored in the memory VMEM.

However, at Step #25, a value equal to the estimated vehicle speed obtained in the previous cycle plus a second predetermined speed ΔV2 is stored in the memory VMEM. It is to be noted that the second predetermined speed ΔV2 may be, by way of example, a value equal to 0 to several percent of the estimated vehicle speed VREF or a speed of approximately 0–3 km/hr.

At Step #28, it is determined whether an antilock brake control flag ALFG, described below with reference to FIG. 7, is set. If it is, the procedure advances to Step #31. However, if the antilock brake control flag ALFG is not set, the procedure advances to Step #29 where it is determined whether the front brake flag FBRK is set. If the front brake flag FBRK is set, the procedure advances to Step #31, and if it is not the procedure advances to Step #30. At Step #30 it is determined whether the rear brake flag RBRK is set. Similarly, if the rear brake flag RBRK is set, the procedure advances to Step #31, and if it is not the procedure advances to Step #35. Thus, if it is determined at Steps #28, 29, and 30 that antilock brake control is in progress or that the front or rear brake is being applied, the procedure advances to Step #31, but if antilock brake control is not in progress and neither the front nor the rear brake is being applied, the procedure advances to Step #35.

At Step #35 the memory VMEM is cleared to 0. It is to be noted that Step #36 marked by a dotted line may be used in place of Step #35. In this case, the estimated vehicle speed VREF obtained in the previous cycle is stored in the memory VMEM.

At Step #31 the front wheel speed VFRN is compared with the rear wheel speed VRER. If the former is greater than the latter, the procedure advances to Step #37. In contrast, if the former is less than the latter, the procedure advances to Step #32. At Step #32 the rear wheel speed VRER and the speed stored in the memory VMEM are compared. If the rear wheel speed VRER is greater, the procedure advances to Step #37, but if the rear wheel speed VRER is less, the procedure advances to Step #33.

At Step #33 it is determined whether the rear wheel use prohibit flag VFIH is set to 1. If it is, the procedure advances to Step #37, but if it is reset the procedure advances to Step #34. At Step #34 the rear wheel speed VRER is set to a register VHI whereas at Step #37 the front wheel speed VFRN is set to the register VHI. More specifically, the front wheel speed VFRN and rear wheel speed VRER are compared at Step #31. If the front wheel speed VFRN is greater, the front wheel speed VFRN is stored in the register VHI. However, if the rear wheel speed VRER is greater and the conditions of Steps #32 and #33 are both cleared, the rear wheel speed VRER is stored in the register VHI. Therefore, even if the rear wheel speed VRER is greater than the front wheel speed VFRN, the front wheel speed VFRN is stored in the register VHI if it is determined at Step #32 that the rear wheel speed VRER is greater than the speed stored in the memory VMEM or it is determined at Step #33 that the rear wheel use prohibit flag VFIH is set to 1.

At Step #38 the speed stored in the register VHI is stored as the estimated vehicle speed VREF. It is to be noted that the Step #39 marked by a dotted line may be used in place of Step #38. In this case, the estimated vehicle speed VREF is filtered based on the speed stored in the register VHI and the estimated vehicle speed VREF obtained in the previous cycle by applying the equation $$\frac{n-1}{n} VREF + \frac{1}{n} VHI$$

to obtain a current estimated vehicle speed VREF that is closer to the actual vehicle speed. Any other alternative filtering can be used.

FIG. 7 is a flow chart for the control algorithm sub-routine S3. The solenoid output controlling the decrease in brake pressure is initially determined by antilock brake control algorithms. Specifically, if locking symptoms are detected in the wheel to which the brakes are applied, the solenoid is driven to lower the brake pressure and thereby correct the locking symptoms. Antilock brake control starts with the solenoid output. The antilock brake control is considered to still be active for a predetermined time T1 even after the solenoid output stops.

At Step #51 it is determined whether a timer ALTM that counts the predetermined time T1 is set to 0. If it is, the procedure advances to Step #52 to determine whether a front brake solenoid is now operating, i.e., whether the front brake pressure is now being reduced. If the front brake solenoid is now operating, the procedure advances to Step #55, but if it is not, the procedure advances to Step #53. At Step #53 it is similarly determined whether a rear brake solenoid is now operating. If it is, the procedure advances to Step #55, but if it is not the procedure advances to Step #54.

The antilock brake control edge flag ALEG is set at Step #55, and is reset at Step #54.

At Steps #56 and 57 it is determined whether the front and rear brake solenoids are operating as described above with respect to Steps #52 and 53. If either of the solenoids is operating to lower the brake pressure, the procedure advances to Step #58 to set the timer ALTM to the predetermined time T1. However, if neither of the solenoids is operating to lower the brake pressure, the procedure advances to Step #59. At Step #59 it is determined whether the timer ALTM is set to 0. If it is, the procedure advances to Step #62 to reset the antilock brake control flag ALFG, which indicates whether antilock brake control is currently in progress, to 0 to indicate that antilock brake control is not in progress.

Figure 8:
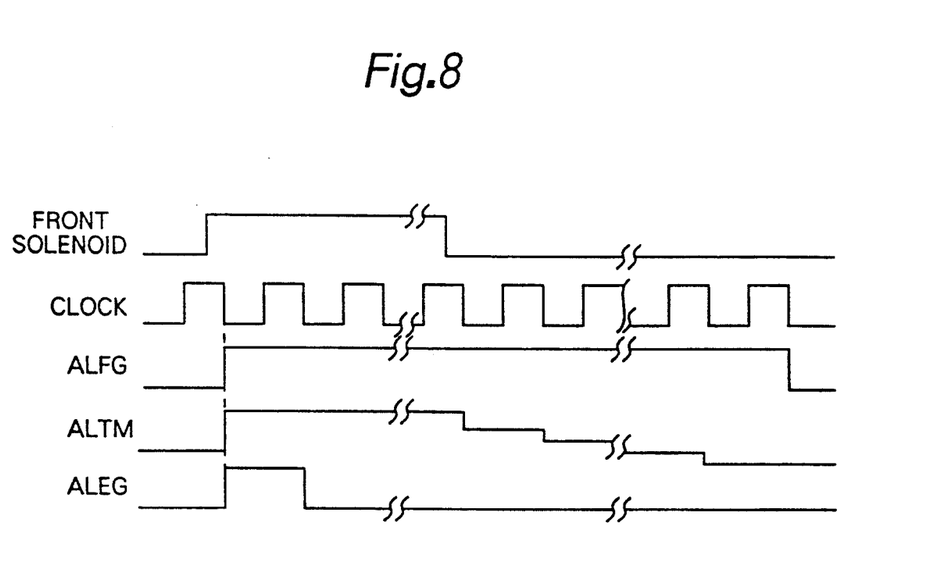

Referring to a timing chart of FIG. 8, the specific operation controlled by the flow chart of FIG. 7 is described with respect to operation of the front brake solenoid only.

When the front brake solenoid is not operating, specifically when antilock brake control is not being applied to the brake, Steps #51, #52, #53, #54, #56, #57, #59, and #62 are executed, resetting both the antilock brake control flag ALFG and the antilock brake control edge flag ALEG to 0 and holding the timer ALTM at 0. If antilock brake control begins and the front brake solenoid output therefore changes from 0 to 1, the first sub-routine cycle thereafter (at a falling edge of the clock signal) causes Steps #52 to #55 to be executed, thereby setting the antilock brake control edge flag ALEG to 1. From Step #56 the procedure advances to Step #58 to set the timer ALTM to the predetermined time T1, after which Steps #59, #60, and #61 are executed, decrementing the timer ALTM by one and setting the antilock brake control flag ALFG to 1. In the next cycle the procedure advances from Step #51 to Step #54, resetting the antilock brake control edge flag ALEG, and from Step #56 to Step #58 to reset the timer ALTM to the predetermined time T1. Steps #59, #60, and #61 are then executed, decrementing the timer ALTM by one and holding the antilock brake control flag ALFG to 1. Thereafter Steps #51, #54, #56, #58, #59, #60, and #61 are looped through repeatedly.

When the front brake solenoid output changes from 1 to 0, Steps #51 and #54 are executed in the first sub-routine S3 cycle thereafter, thus holding the antilock brake control edge flag ALEG to 0. Steps #56, #57, #59, #60, and #61 are then executed, holding the antilock brake control flag ALFG set to 1 during the period the timer ALTM is being decremented. Thus, the antilock brake control flag ALFG is held set to 1 until the timer ALTM counts down from the predetermined time T1 to 0.

The operation of the estimated vehicle speed detection apparatus for motorcycles according to the present invention is described hereinbelow with reference to a graph of FIG. 9. It is assumed in this description that the brakes are not applied to either the front or the rear wheel, and antilock brake control is not in progress. Therefore, the flags FBEG, RBEG, ALEG, ALFG, FBRK, RBRK, and VFIH are all reset to 0.

Figure 9:
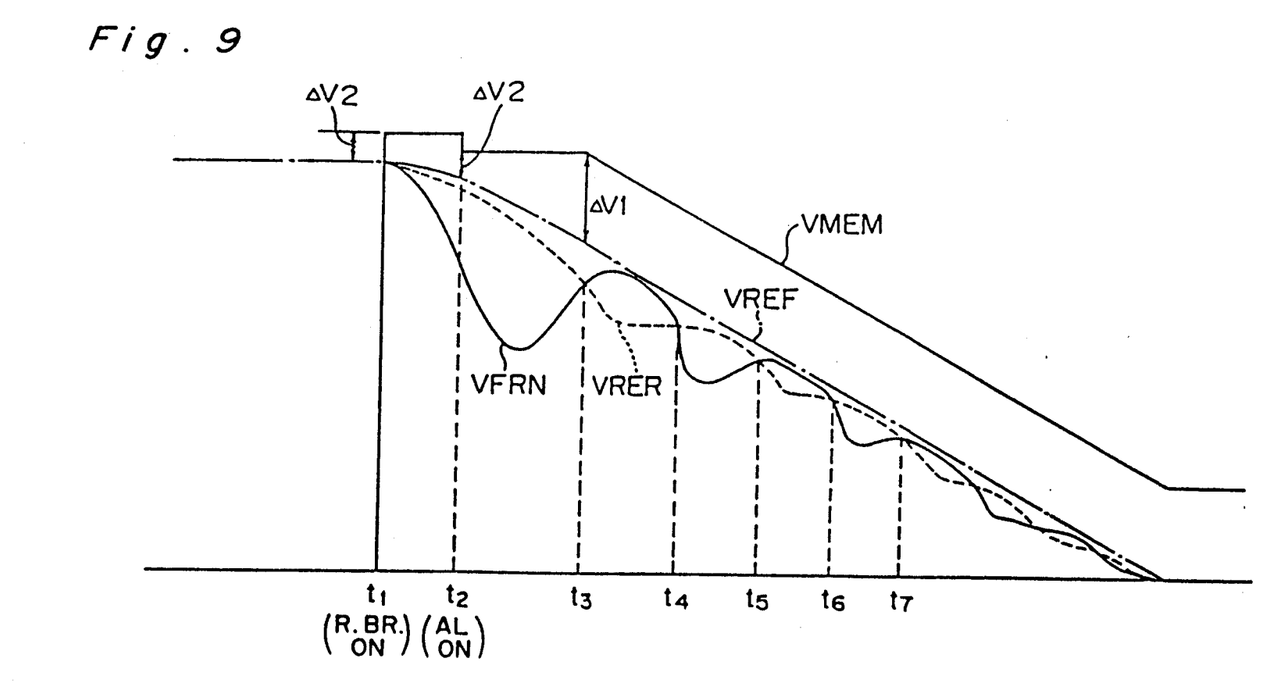
FIG. 9 is a graph used to describe the procedure whereby the estimated vehicle speed is calculated according to the present invention.

It is assumed that the front brake is applied at time t1 in FIG. 9. Thus, the sub-routine S1 shown in FIG. 3 sets the front brake flag FBRK to 1 and sets the front brake edge flag FBEG to 1. Therefore, in the sub-routine S2 in FIG. 5, the procedure advances from Step #21 to Step #25, and the sum of the estimated vehicle speed VREF obtained in the previous cycle plus a second predetermined speed ΔV2 is stored in the memory VMEM.

It is assumed that antilock brake control is started at time t2. Therefore, the antilock brake control edge flag ALEG is set to 1 at Step #55 in FIG. 7, and the antilock brake control flag ALFG is set to 1 at Step #61. Thus, the procedure advances from Step #23 to Step #25 in FIG. 5 and the sum of the estimated vehicle speed VREF obtained in the previous cycle plus the second predetermined speed ΔV2 is stored in the memory VMEM, updating the previously stored value. In addition, because either the front brake is applied or antilock brake control is in progress from time t1 to time t3, the flow shown in FIG. 5 advances from Step #28 or Step #29 to Step #31. The front wheel speed VFRN and rear wheel speed VRER are thus compared with each other. In the example shown in FIG. 9, because the rear wheel speed VRER is greater than the front wheel speed VFRN and less than the estimated vehicle speed stored in the memory VMEM at that time (Step #32) and the rear wheel use prohibit flag VFIH is reset to 0, the rear wheel speed VRER is stored in the register VHI at Step #34. This value, i.e., the rear wheel speed, is thus set as the estimated vehicle speed VREF (Step #38), or an estimated vehicle speed VREF filtered to a value closer to the actual vehicle speed based on the rear wheel speed (Step #39) is calculated and set as the estimated vehicle speed VREF.

Furthermore, because the front brake edge flag FBEG, rear brake edge flag RBEG, and antilock brake control edge flag ALEG are already all reset to about time t3, flow moves from Step #23 to Step #26 and the estimated vehicle speed stored in the memory VMEM is compared with the sum of the estimated vehicle speed VREF from the previous cycle and the first predetermined speed ΔV1. If the estimated vehicle speed stored in the memory VMEM is greater, i.e., if the difference between the stored estimated vehicle speed and the estimated vehicle speed VREF updated each cycle is greater than the first predetermined speed ΔV1, the procedure advances to Step #27 and the estimated vehicle speed stored in the memory VMEM is updated to the sum of the estimated vehicle speed VREF updated each cycle plus the first predetermined speed ΔV1. If the estimated vehicle speed VREF continues to decrease thereafter, the estimated vehicle speed stored in the memory VMEM each cycle is also updated.

From time t3 to t4, because the front wheel speed VFRN is greater than the rear wheel speed VRER, the procedure advances from Step #31 to Step #37 and the front wheel speed VFRN is stored in the register VHI. At Step #38, the front wheel speed is set as the estimated vehicle speed VREF, or the estimated vehicle speed VREF filtered to a value closer to the actual vehicle speed is calculated and set as the estimated vehicle speed VREF.

It is to be noted that, while not appearing in the graph of FIG. 9, if the rear wheel speed VRER indicated by a dotted line exceeds the estimated vehicle speed VREF shown by the dot-dash line, Steps #31, #32, and #37 are executed, and the front wheel speed VFRN is used in the calculation of the estimated vehicle speed VREF.

Furthermore, while not appearing in the graph of FIG. 9, even if the rear wheel speed VRER indicated by a dotted line is greater than the front wheel speed VFRN shown by the solid line and is less than the estimated vehicle speed VREF and the rate of acceleration is greater than the predetermined acceleration ATHR, the rear wheel use prohibit flag VFIH is set to 1 at Step #48 in FIG. 6. The procedure therefore advances from Step #33 to Step #37 in FIG. 5 and the front wheel speed VFRN is again used to calculate the estimated vehicle speed.

As will be known from the above description of an estimated vehicle speed detection apparatus for motorcycles according to the present invention, an estimated vehicle speed closer to the actual vehicle speed can be calculated when antilock brake control is in progress or a brake is applied because the estimated vehicle speed is calculated using the higher of the front wheel speed or the rear wheel speed, which does not exceed the previous estimated vehicle speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An estimated vehicle speed detection apparatus for motorcycles which calculates an estimated vehicle speed based on a front wheel speed and a rear wheel speed and applies antilock brake control to each of front and rear wheels based on a calculated estimated vehicle speed, said estimated vehicle speed detection apparatus comprising:

storage means for storing the estimated vehicle speed at the time an application of antilock brake control to any one of the front and rear wheels is started, and storing the estimated vehicle speed at the time application of brakes to anyone of the front and rear wheels starts;

estimated vehicle speed calculation means for comparing the front wheel speed and the rear wheel speed to calculate the estimated vehicle speed based on the higher of the front wheel speed and the rear wheel speed, while any one of the antilock brake control, a front brake, and a rear brake is applied, the use of the rear wheel speed for estimation of a vehicle speed being inhibited if said rear wheel speed is higher than the estimated vehicle speed previously stored in said storage means;

means for comparing the estimated vehicle speed stored in said storage means and a newly obtained estimated vehicle speed; and means for updating the value stored in said storage means to the sum of the newly obtained estimated vehicle speed plus a first predetermined value when the stored estimated vehicle speed is greater than the newly obtained estimated vehicle speed plus the first predetermined value.

2. The apparatus according to claim 1 wherein the first predetermined value ranges from 10 km/hr to 20 km/hr.

3. The apparatus according to claim 1 wherein said storage means stores a value equal to the estimated vehicle speed plus a second predetermined value.

4. The apparatus according to claim 1 further comprising means for resetting the value stored in said storage means to zero if antilock brake control is not currently applied to each of the front and rear wheels and the brakes are not currently applied to each of the front and rear wheels.

5. The apparatus according to claim 1 further comprising means for calculating the estimated vehicle speed based on the front wheel speed if antilock brake control is not currently applied to each of the front and rear wheels and the brakes are not currently applied to each of the front and rear wheels.

6. The apparatus according to claim 1 further comprising means for prohibiting calculation of the estimated vehicle speed based on the rear wheel if the rear wheel speed is greater than the front wheel speed and a rate of rear wheel acceleration is greater than or equal to a predetermined rate of acceleration.

7. The apparatus according to claim 6 further comprising:

counter means for counting a given period after it is determined that the rear wheel speed is less than or equal to the front wheel speed and the rate of rear wheel acceleration is less than the predetermined rate of acceleration; and means for prohibiting calculation of the estimated vehicle speed based on the rear wheel during said given period.

8. The apparatus according to claim 1 wherein said estimated vehicle speed calculation means defines the estimated vehicle speed to be one of the wheel speeds.

9. The apparatus according to claim 1 wherein said estimated vehicle speed calculation means defines the estimated vehicle speed to be a value resulting from filtering one of the wheel speeds.

* * * * *

UNITED STATES PATENT AND TRADEMARK OFFICE
CERTIFICATE OF CORRECTION

PATENT NO. : 5,240,313
DATED : August 31, 1993
INVENTOR(S) : M. YOSHINO et al.

It is certified that error appears in the above-indentified patent and that said Letters Patent is hereby corrected as shown below:

At column 10, line 2 (claim 1, line 12), change "anyone" to ---any one---.

Signed and Sealed this

Seventeenth Day of September, 1996

Attest:

BRUCE LEHMAN

*Attesting Officer*  *Commissioner of Patents and Trademarks*